United States Patent [19]

Behrends

[11] Patent Number: 5,663,776
[45] Date of Patent: Sep. 2, 1997

[54] DISPLAY DEVICE WITH CELLS ARRANGED AT DISTANCE FROM EACH OTHER VIA ANGULARLY SHAPED SUPPORTS HAVING SPACER LEGS

[75] Inventor: Heinz Behrends, Bad Herrenalb, Germany

[73] Assignee: Valeo Borg Instruments Verwaltung GmbH, Remchingen, Germany

[21] Appl. No.: 528,689

[22] Filed: Sep. 15, 1995

[30] Foreign Application Priority Data

Sep. 20, 1994 [DE] Germany .................. 44 33 310.2

[51] Int. Cl.⁶ .............. G02F 1/1333; G02F 1/1347; H05K 5/00; H05K 7/00
[52] U.S. Cl. .................. 349/58; 349/74; 361/681
[58] Field of Search .............. 359/53, 83; 349/58, 349/74; 361/681; 348/836; 364/708.1

[56] References Cited

U.S. PATENT DOCUMENTS

| | | | |
|---|---|---|---|
| 4,848,875 | 7/1989 | Baughman et al. | 359/52 |
| 4,964,251 | 10/1990 | Baughman et al. | 349/16 |
| 5,148,299 | 9/1992 | Terada | 359/73 |
| 5,469,280 | 11/1995 | Jang | 359/53 |

FOREIGN PATENT DOCUMENTS

| | | | |
|---|---|---|---|
| 58-223121 | 12/1983 | Japan . | |
| 63-204232 | 8/1988 | Japan | 359/83 |
| 1-225920 | 9/1989 | Japan | 359/53 |
| 1-267613 | 10/1989 | Japan . | |
| 5-93909 | 4/1993 | Japan . | |
| 5-150239 | 6/1993 | Japan . | |
| 6-18916 | 1/1994 | Japan . | |

OTHER PUBLICATIONS

Motorola Technical Developments, Bd. 11, 1 Oct. 1990, Schaumburg, IL.

Patent Abstracts of Japan vol. 013 No. 550, 8 Dec. 1989 & JP 01-229283.

*Primary Examiner*—William L. Sikes
*Assistant Examiner*—Walter J. Malinowski
*Attorney, Agent, or Firm*—Morgan & Finnegan, LLP

[57] ABSTRACT

In the case of a display device of glasses arranged at a distance from each other or of other imaging cells, such as in particular a combination of twisted nematic liquid-crystal cells, the design of a narrow, well-ventilated gap is produced in the course of constructing the device, in a manner such that on the supports for the first cell to be mounted there are formed thin spacer legs that run in an angled manner, which reach beyond the cell border and thereby engage as spacers into the subsequent gap, when the cell that is to arranged in front of it in the assembly direction, is laid against these spacer legs.

7 Claims, 1 Drawing Sheet

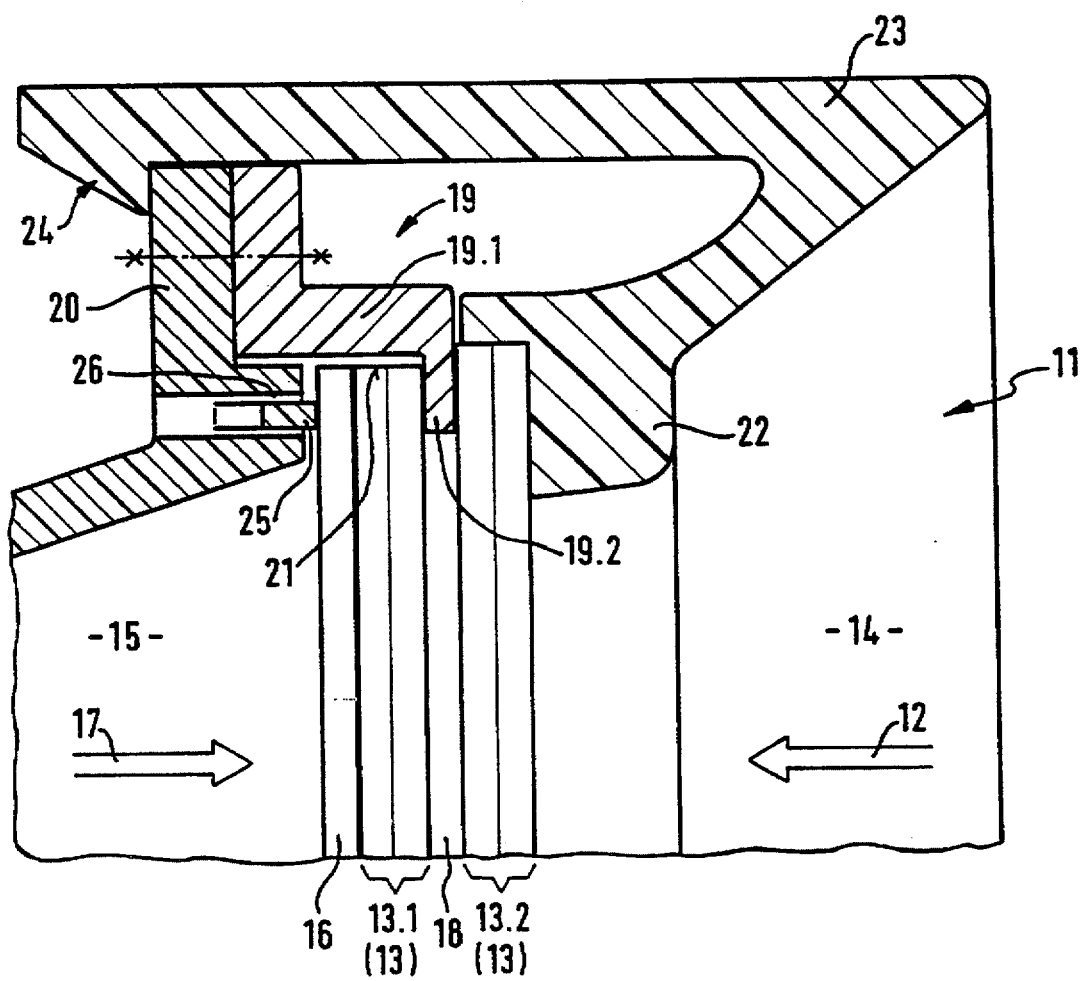

DISPLAY DEVICE WITH CELLS ARRANGED AT DISTANCE FROM EACH OTHER VIA ANGULARLY SHAPED SUPPORTS HAVING SPACER LEGS

FIELD OF THE INVENTION

The invention concerns a display device and the like.

BACKGROUND OF THE INVENTION

Such a device is known from Patent DE-3 438 756 as a D-STN (Double-Layer Super-Twisted Nematic) cell or double-layer twisted nematic cell. In that case the display device is put together out of two nematic liquid-crystal cells that are arranged at a distance one behind the other, one of which cells serves to provide information and the other as a compensating cell for increasing the contrast.

However, the invention also extends to display devices that operate with other electro-optical effects; the concept of "cell" as used in this invention may also comprise a simple disc, for instance a filter disc or protective disc, which is to be supported at a distance for the purpose of preventing optical disturbances caused by Newton rings.

What is decisive is that the invention solves the technical problem of providing a clearance distance which is defined and, as a rule, as thin as possible (less than 1 millimeter), without significantly increasing the number of components to be assembled or excessively impairing the assembly process.

This task is solved by the construction described herein. For appropriate further developments, express reference is also made to the claims and to the descriptive drawings.

According to that solution, the supports—which in any case are required for the first-to-be-mounted cell—simultaneously serve (in conjunction with the thin angled legs that are designed onto the supports for that purpose) as spacers, in order to maintain the gap from the cell which will then be arranged in front of the first-mounted cell. Because of the construction of the display-device housing (e.g., in the course of connecting a viewside aperture frame with a rear light box), the two cells—supported one in front of the other—are then pressed on both sides against the spacer legs that protrude into the gap; the process may be further elastically enhanced by means of small springs designed to compensate for tolerances.

In any event, the above obviates the need for the prior expensive practice of inserting a separate thin frame-shaped circumferential spacer, taking the form of a cut-out built-in film or a pressure mass, made of adhesive or colorant and thickly applied to one of the surfaces, between the cells that are to be distanced from each other. What is more, there now remain sufficient openings—between the individual spacer-legs arranged at a distance next to each other, and next to the springs—for an exchange of air with the environment; this effectively counteracts any disturbances caused by the formation of spots due to the accumulation of moisture within the gap.

IN THE FIGURE

For a more detailed explanation of a preferred example of embodyment, the sole FIGURE of the drawing shows—greatly enlarged, in a broken-off lengthwise cross-sectional representation that is not to scale—a display device constructed according to the invention.

DETAILED DESCRIPTION OF THE PREFERRED EMBODIMENT (S)

For a more detailed appreciation of the invention, attention is invited to the drawing, which shows two twisted nematic liquid-crystal cells that are arranged at a distance from each other, of which only the front and rear discs are visible (but not the thin chambers enclosed between them, which are filled with liquid-crystal material). The matter involves a contrast cell 13.1 (arranged in the back), when seen from the viewing direction 12, behind an information cell 13.2; however, this mutual arrangement can also be reversed.

The cells 13 lie on the bottom of a viewing tube 14 (which shields against mirroring effects), which viewing tube is sunk in the viewing direction into the visible surface of an automotive dashboard. Arranged behind the dashboard there is a light box 15, covered by a diffusing screen or color disc 16 which disc is supported at a minimal distance behind the rear cell 13.1. In order to prevent the optical disturbances that might result therefrom, the color disc is roughened or equipped with spacing lugs, on its side that faces cell 13.1 and abuts against it; this ensures that the defined minimal distance is permanently maintained.

Against the direction of ambient illumination and the viewing direction 12, the display device 11 is irradiated out of the light box 15 from a light source in the direction of transillumination 17.

It should be noted that it is important, from the viewpoint of a color-stable and long-term constant quality of representation of the display device, that the appearance of Newton rings and of moisture spots be prevented in the narrow critical gap 18, between the two cells 13.1 and 13.2, each of which is about twice as thick as the gap 18 itself. In accordance with the present invention, the maintenance of this gap is ensured by means of structural steps during the process of assembling the display device 11, without thereby significantly complicating the assembly of the display device.

This is achieved by means of supports 19, running like angled beams, which feature only short lengths crosswise to the plane of the paper. The supports 19 are attached to opposing side walls 20 of the light box 15 by means of adhesive, snap-type or threaded connections, or else are formed onto them in a manner such that each of the supports 19 encompasses the front border of the rear cell 13.1 and in so doing engages (acting as a spacer) into the gap 18 between the cells 13. For that purpose, a comparatively massive lengthwise leg 19.1 extends—from its attachment to the side-wall 20 of the light box, in the transillumination direction 17, crosswise to the border 21 of the rear cell 13.1, to the beginning of the gap 18—in order to change here into a spacer leg 19.2 that is contrastingly thin (although drawn in an unrealistically thick fashion, for purposes of illustration) and runs roughly perpendicularly to the first leg 19.1. Consequently the latter somewhat protrudes from the cell border 21, laterally into the gap 18. The front cell 13.2 (in the viewing direction 12) abuts against this spacer leg 19.2. This cell is supported and pressed (in the viewing direction 12) by an aperture frame 22, formed onto the housing of the tube 14, which frame runs around in front of the front cell 13.2, on the visible side. This frame 22 is a component of the instrument housing 23 into which is formed the tube 14. The housing 23 is locked together (by a notched, threaded or clamping connection 24) with extensions at the side walls 20 of the light box 15. In this fashion, after assembly the two cells 13 are held together into the display device, with the interposition of the spacer legs 19.2. In so doing, a number of lever- or arc-shaped springs 25, which project from the side wall 20 of the light box 15 in the transillumination direction 17, ensure a uniform compensation of manufacturing tolerances by elastically pressing the rear cell 13.1 against the spacer leg 19.2. The slits 26, into which the springs 25 can be pressed in a flexible manner, as well as the clearance distances between adjacent spacer legs 19.2 represent advantageous embodiments of air-exchange openings by which any formation of Newton rings and moisture accumulation can be also be counteracted.

For the assembly of the display device 11 the light box 15 is equipped with the supports 19 and then the rear cell 13.1 plus color disc 16 is inserted. For that purpose the color disc 16 and rear cell 13 can be pushed into the groove (crosswise to the plane of the paper of the sketch) which results between the side wall 20 and the spacer legs 19.2 distal from it, which spacer legs face each other on opposite sides; or else the spacer legs 19.2 are bent upward a bit in the transillumination direction 17, so that one can then insert the rear cell 13.1 plus color disc 16 from the front—i.e., in the viewing direction 12. Next, the front cell 13.2 is laid in the viewing direction 12 onto the spacer leg 19.2. In this fashion the gap 18 between the cells 13 is already defined; the construction of the display device 11 is fixed by attaching the housing 23 to the light box 15.

I claim:

1. Display device having a housing for a light box, a visible side frame and liquid-crystal cells which are arranged one in front of the other and spaced from each other by a narrow gap, each of the cells having a respective border, comprising angularly shaped supports having thin spacer legs, said spacer legs being in the gap between the cells and engaged at the borders of the cells, said angularly shaped supports having other legs outside of the gap and transverse to the border of one of the cells said thin spacer legs and said other legs being attached to the housing of the display device between the light box and the visible frame.

2. Display device according to claim 1, further comprising springs for pressing against at least one of the cells crosswise to said spacer legs, said springs being attached to the display device.

3. Display device according to claim 1, wherein the cells are locked with each other with said spacer legs interposed in said gap between the cells, the cells being between the light-box and the visible-side frame, and the housing being connected with the light box.

4. Display device according to claim 2, wherein springs press against at least one of the cells crosswise to said spacer legs, said springs being attached to the display device.

5. Display device according to claim 1, wherein the light box further comprises a side wall, said spacer legs face each other, and said supports other legs are engaged with said side wall of the light box.

6. Display device according to claim 1, further comprising a sidewall for the light box, said sidewall being spaced from said spacer legs to form a groove therebetween, wherein one of the cells is received in said groove between said side wall of the light box and said spacer legs.

7. Display device according to claim 1, wherein the cells further comprise two twisted nematic cells, one of said cells being a contrast cell and the other of said cells being an information cell.

* * * * *